United States Patent
Kawakami et al.

(10) Patent No.: US 12,134,261 B2
(45) Date of Patent: Nov. 5, 2024

(54) SELF-ADHESIVE PREPREG AND METHOD FOR PRODUCING SAME

(71) Applicant: Teijin Limited, Osaka (JP)

(72) Inventors: Atsushi Kawakami, Tokyo (JP); Matthias Schubert, Tokyo (JP); Toru Kaneko, Tokyo (JP)

(73) Assignee: Teijin Limited, Osaka (JP)

( * ) Notice: Subject to any disclaimer, the term of this patent is extended or adjusted under 35 U.S.C. 154(b) by 697 days.

(21) Appl. No.: 16/496,569

(22) PCT Filed: Mar. 22, 2018

(86) PCT No.: PCT/JP2018/011556
§ 371 (c)(1),
(2) Date: Sep. 23, 2019

(87) PCT Pub. No.: WO2018/174217
PCT Pub. Date: Sep. 27, 2018

(65) Prior Publication Data
US 2021/0107250 A1  Apr. 15, 2021

(30) Foreign Application Priority Data

Mar. 23, 2017  (JP) ................... 2017-058272

(51) Int. Cl.
*B32B 5/26* (2006.01)
*B29B 11/16* (2006.01)
(Continued)

(52) U.S. Cl.
CPC ............... *B32B 5/26* (2013.01); *B29B 11/16* (2013.01); *B29B 15/12* (2013.01); *B29C 70/682* (2013.01);
(Continued)

(58) Field of Classification Search
CPC .. B32B 5/26; B32B 3/12; B32B 5/022; B32B 5/024; B32B 7/12; B32B 37/12;
(Continued)

(56) References Cited

U.S. PATENT DOCUMENTS

| | | |
|---|---|---|
| 4,671,841 A | 6/1987 | Stephens |
| 5,037,498 A | 8/1991 | Umeda |

(Continued)

FOREIGN PATENT DOCUMENTS

| | | |
|---|---|---|
| CN | 101432358 A | 5/2009 |
| CN | 102971141 A | 3/2013 |

(Continued)

OTHER PUBLICATIONS

Loctite EA 7000 Aero Epoxy Film Adhesive Technical Process Bulletin, Nov. 2015. (Year: 2015).*

(Continued)

*Primary Examiner* — Christopher W Raimund
(74) *Attorney, Agent, or Firm* — Norris McLaughlin, P.A.

(57) ABSTRACT

The present invention provides a self-adhesive prepreg which is characterized by comprising: a base prepreg that is composed of reinforcing fibers and a thermosetting resin composition (I), some or all of which is impregnated into a reinforcing fiber layer that is formed of the reinforcing fibers; an adhesive layer that is composed of a nonwoven fabric which is laminated on at least one surface of the base prepreg so as to be integrated with the base prepreg and a thermosetting resin composition (II) which is laminated on the surface of the nonwoven fabric so as to be integrated with the nonwoven fabric.

7 Claims, 5 Drawing Sheets

(51) Int. Cl.

| | |
|---|---|
| *B29B 15/12* | (2006.01) |
| *B29C 70/68* | (2006.01) |
| *B29C 70/78* | (2006.01) |
| *B29K 63/00* | (2006.01) |
| *B29K 307/04* | (2006.01) |
| *B29L 31/60* | (2006.01) |
| *B32B 3/12* | (2006.01) |
| *B32B 5/02* | (2006.01) |
| *B32B 7/12* | (2006.01) |
| *B32B 37/12* | (2006.01) |
| *B32B 37/14* | (2006.01) |

(52) U.S. Cl.
CPC ............... *B29C 70/78* (2013.01); *B32B 3/12* (2013.01); *B32B 5/022* (2013.01); *B32B 5/024* (2013.01); *B32B 7/12* (2013.01); *B32B 37/12* (2013.01); *B32B 37/146* (2013.01); *B29K 2063/00* (2013.01); *B29K 2307/04* (2013.01); *B29L 2031/608* (2013.01); *B32B 2260/021* (2013.01); *B32B 2260/046* (2013.01); *B32B 2262/0284* (2013.01); *B32B 2262/106* (2013.01); *B32B 2305/024* (2013.01); *B32B 2305/076* (2013.01)

(58) Field of Classification Search
CPC ............ B32B 37/146; B32B 2260/021; B32B 2260/046; B32B 2262/0284; B32B 2262/106; B32B 2305/024; B32B 2305/076; B32B 2037/1253; B32B 37/0076; B32B 37/144; B32B 37/24; B29B 11/16; B29B 15/12; B29C 70/682; B29C 70/78; B29C 70/763; B29K 2063/00; B29K 2307/04; B29L 2031/608; B29D 99/0089; B29D 24/005
See application file for complete search history.

(56) References Cited

U.S. PATENT DOCUMENTS

| | | | | |
|---|---|---|---|---|
| 6,429,157 | B1* | 8/2002 | Kishi | B32B 27/12 |
| | | | | 428/116 |
| 6,579,391 | B1* | 6/2003 | Shiffler | D04H 5/03 |
| | | | | 156/181 |
| 2001/0042593 | A1 | 11/2001 | Zhou et al. | |
| 2002/0090490 | A1* | 7/2002 | Kawasumi | B32B 5/26 |
| | | | | 428/113 |
| 2008/0233344 | A1* | 9/2008 | Grob | B29D 24/005 |
| | | | | 428/116 |
| 2009/0068395 | A1 | 3/2009 | Kousaka et al. | |
| 2010/0170746 | A1 | 7/2010 | Restuccia et al. | |
| 2012/0301665 | A1 | 11/2012 | Mortimer et al. | |
| 2013/0130584 | A1 | 5/2013 | Fujiwara et al. | |

FOREIGN PATENT DOCUMENTS

| | | |
|---|---|---|
| EP | 2 017 296 A1 | 1/2021 |
| JP | S63-122774 A | 5/1988 |
| JP | H03-90340 A | 4/1991 |
| JP | H06-47850 A | 2/1994 |
| JP | 2001-260157 A | 9/2001 |
| JP | 2002-316377 A | 10/2002 |
| JP | 2003-171482 A | 6/2003 |
| JP | 2005-119236 A | 5/2005 |
| JP | 2010-275505 A | 12/2010 |
| JP | 2016-040122 A | 3/2016 |

OTHER PUBLICATIONS

Sancaktar, "Mechanical Behavior of Solid Film Adhesives with Scrim Carrier Cloths", Modulated Structural Materials, Tsakalakos ed., 1984. (Year: 1984).*

International Search Report dated Apr. 18, 2018, issued in connection with PCT International Application No. PCT/JP2018/015566.

Translation of International Search Report dated Apr. 18, 2018, issued in connection with PCT International Application No. PCT/JP2018/015566.

* cited by examiner

[Fig. 1]
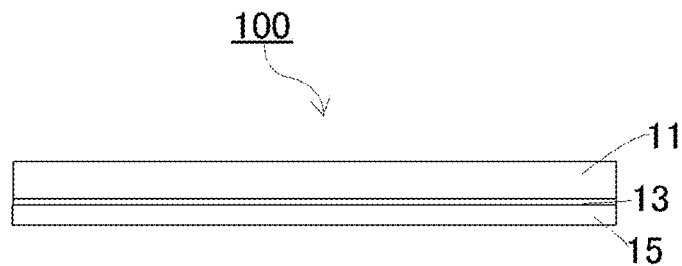
[Fig. 2]
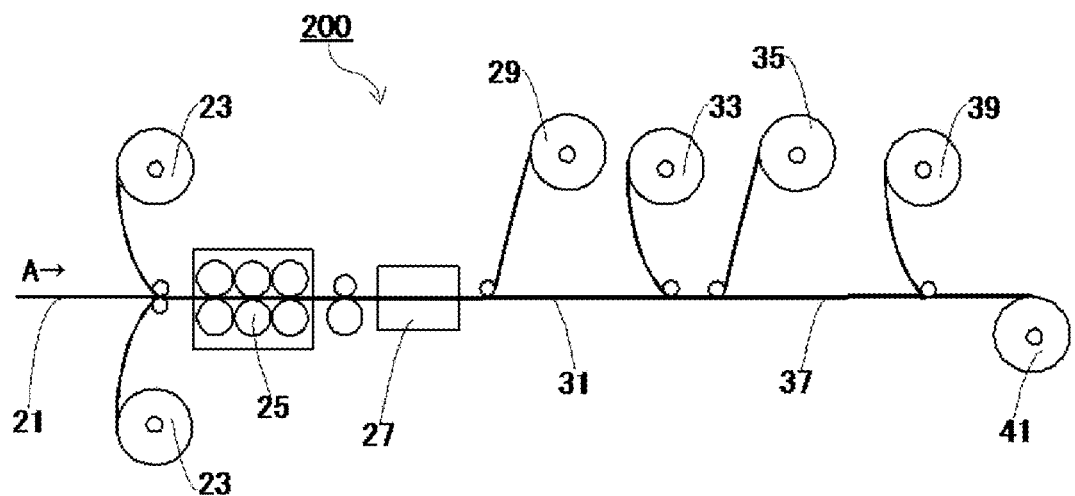
[Fig. 3]
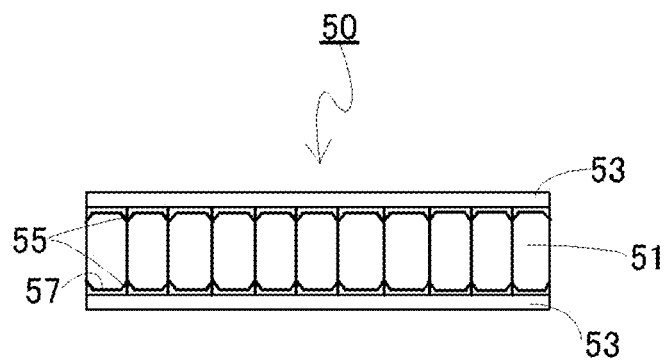

[Fig. 4]
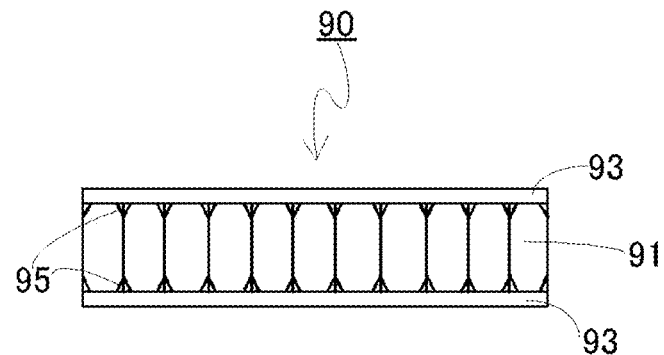
[Fig. 5]
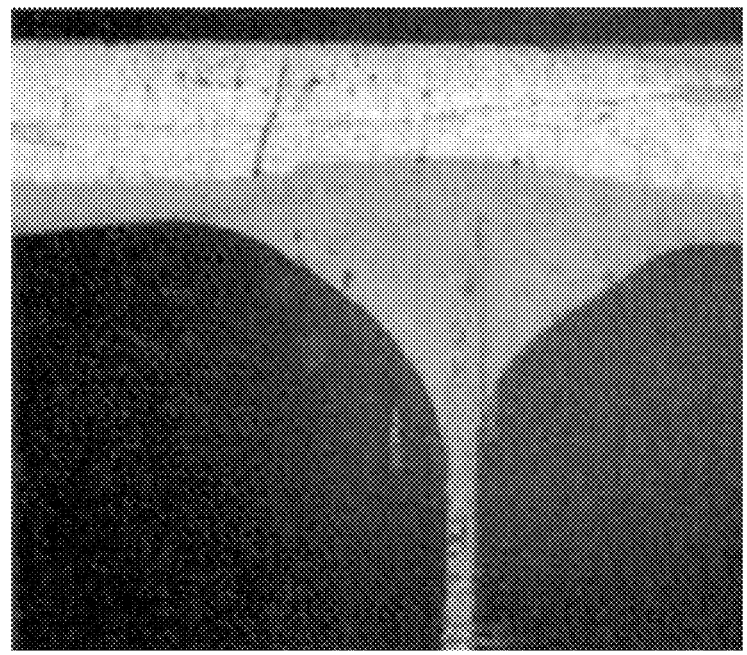

[Fig. 6]
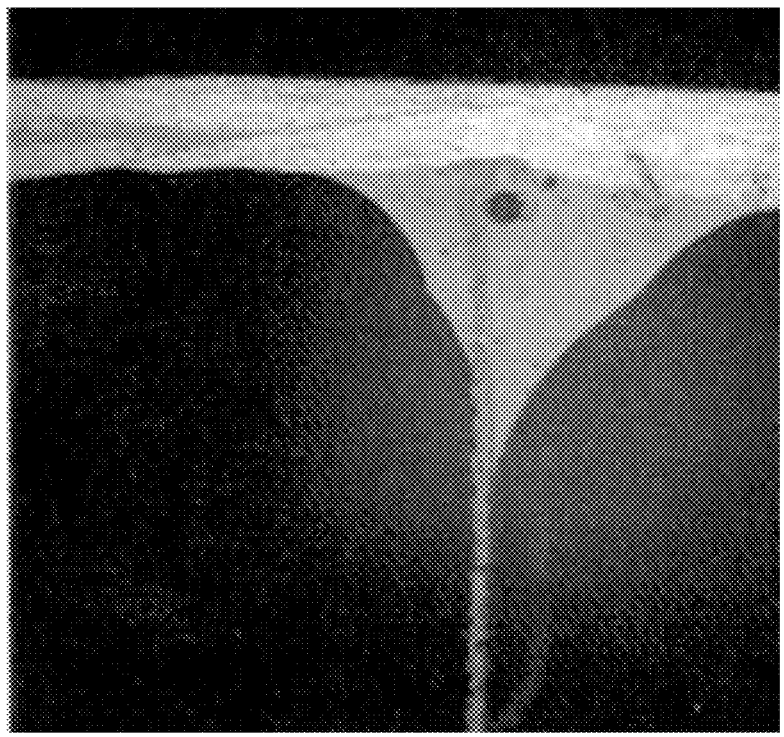
[Fig. 7]
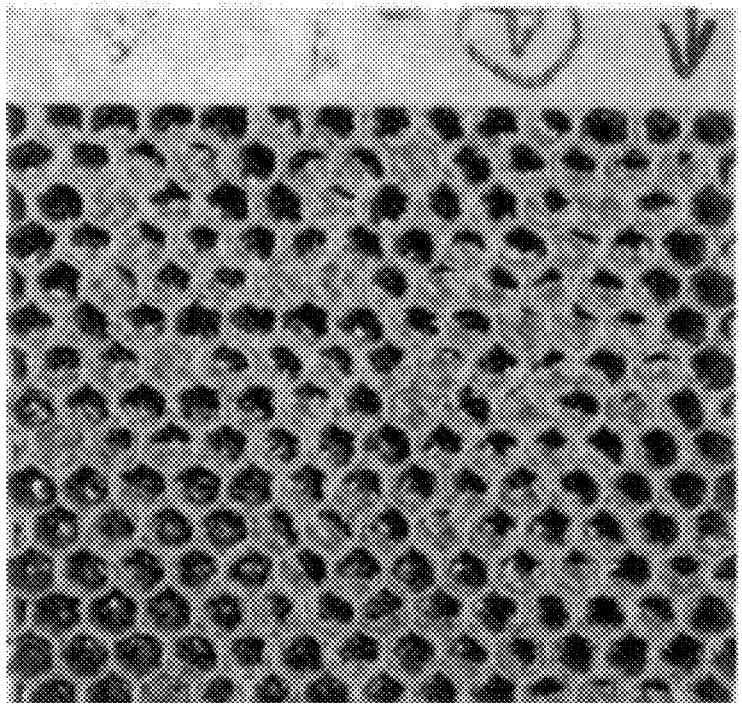

[Fig. 8]
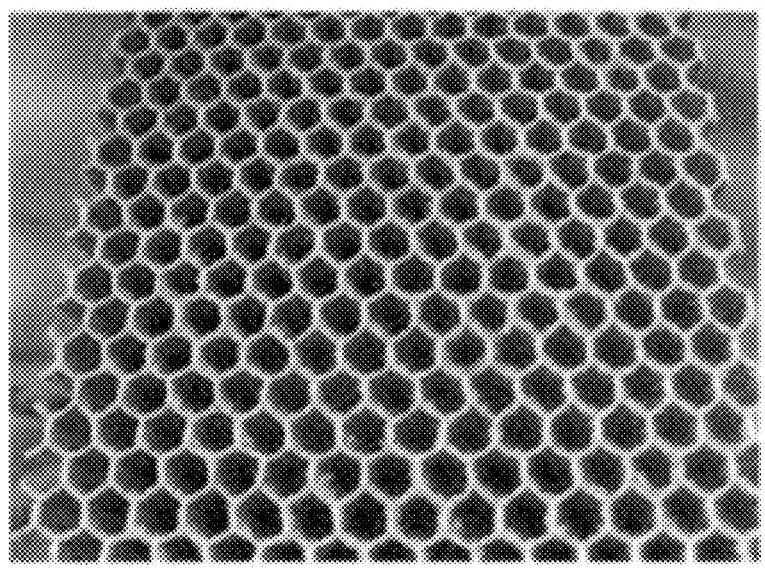

[Fig. 9]
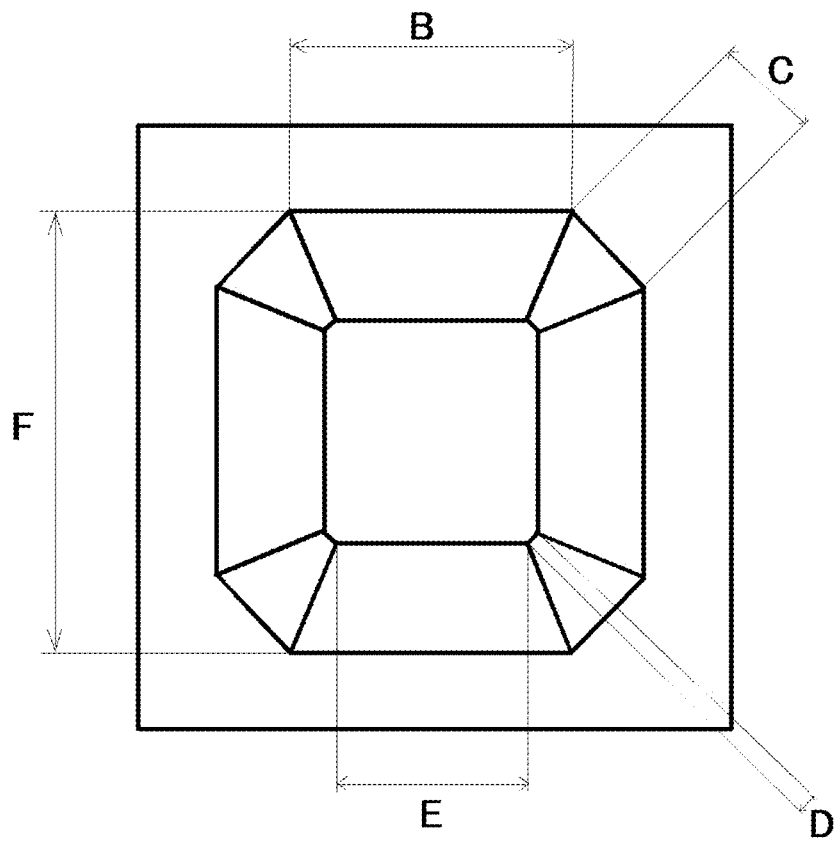
9(a)
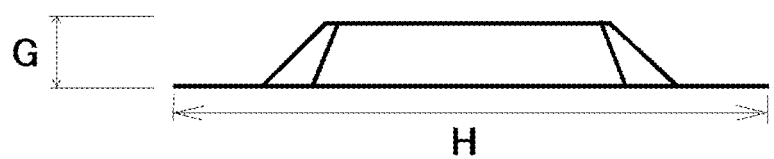
9(b)

SELF-ADHESIVE PREPREG AND METHOD FOR PRODUCING SAME

This application is a 371 application of PCT/JP2018/011556 filed Mar. 22, 2018, which claims foreign priority benefits under 35 U.S.C. § 119 of Japanese Application No. 2017-058272 filed Mar. 23, 2017, the disclosures of each of which are incorporated by reference herein in their entirety.

TECHNICAL FIELD

The present invention relates to a self-adhesive prepreg and a method for producing the same. The present invention particularly relates to a self-adhesive prepreg suitable for producing a honeycomb laminated composite material and a method for producing the same.

BACKGROUND ART

Honeycomb laminated composite materials have been widely used as a lightweight structure material for aircrafts and the like. The honeycomb laminated composite material is formed by a honeycomb core and a surface material attached to each surface of the honeycomb core. As the surface material, a thin plate formed of metal or a fiber reinforced composite material has been widely used. The honeycomb laminated composite material including the thin plate formed of the fiber reinforced composite material as the surface material is produced by laminating a prepreg on each surface of a honeycomb core serving as a core material and then curing the prepreg.

Methods for laminating the prepreg on the honeycomb core include:

(1) a method of directly laminating, on the honeycomb core, what is called a self-adhesive prepreg in which a matrix resin that forms a prepreg functions as an adhesive for the honeycomb core, and (2) a method of laminating a normal prepreg on the honeycomb core with a film-shaped adhesive interposed therebetween. Of these methods, the method of using the self-adhesive prepreg is superior in reducing the weight and simplifying the process.

The honeycomb core and the surface material are attached together through the resin dripping that is formed between the surface material and the honeycomb core, that is, fillet. In this fillet part, however, stress tends to concentrate when the surface material is separated from the honeycomb laminated composite material. The honeycomb laminated composite material that is produced using the conventional self-adhesive prepreg is not strong enough against the separation.

FIG. 4 is an explanatory view illustrating a cross section of a honeycomb laminated composite material produced using the conventional self-adhesive prepreg. In FIG. 4, 90 denotes a honeycomb laminated composite material, which is formed by having a surface material 93 attached to each surface of a honeycomb core 91. Along a wall surface of the honeycomb core 91, fillet 95 is formed. In the case of using the conventional self-adhesive prepreg, just the fillet 95 is formed and therefore, the adhesion is insufficient. FIG. 6 is a photograph corresponding to a drawing illustrating a cross section of a honeycomb laminated composite material that is produced using the conventional self-adhesive prepreg, and the structure illustrated in FIG. 4 can be observed in this photograph. FIG. 8 is a photograph corresponding to a drawing illustrating a surface of the honeycomb core after the surface material is separated from the honeycomb laminated composite material that is produced using the conventional self-adhesive prepreg. It is understood that openings of the honeycomb core are not filled with the resin.

Patent Literature 1 has disclosed the honeycomb laminated composite material that is formed by laminating an open structure sheet on a surface of honeycomb core, laminating a self-adhesive prepreg, and then molding the honeycomb laminated composite material with heat and pressure. In this honeycomb laminated composite material, the resin of the prepreg passes the open structure sheet to be supplied to the honeycomb core side and attached thereto. For this reason, the prepreg has a resin content of at least 42% by mass according to the literature.

Patent Literature 2 has disclosed a honeycomb laminated composite material in which a nonwoven fabric is laminated on a surface of a honeycomb core, laminating a self-adhesive prepreg, and then molding the honeycomb core with heat and pressure. In this honeycomb laminated composite material, the resin of the prepreg passes the nonwoven fabric to be supplied to the core material side and attached thereto. For this reason, the prepreg needs to have a high resin content. However, increasing the resin content in the prepreg easily causes the decrease in flexibility of the prepreg (decrease in draping property).

CITATION LIST

Patent Literature

Patent Literature 1: JP 2016-040122 A
Patent Literature 2: JP H6-47850 A

SUMMARY OF INVENTION

Technical Problem

In the conventional honeycomb laminated composite material, the resin of the prepreg is supplied to the honeycomb core side, so that the prepreg and the honeycomb core are attached together. Alternatively, the prepreg and the honeycomb core are attached together through a film adhesive. By such attachment, the resin enters along the wall surface of the honeycomb core and the fillet is formed on a wall surface part of the honeycomb core. This fillet is formed only near the wall surface part of the honeycomb core, and since the stress caused in the separation concentrates on the fillet and its periphery, the peeling strength is insufficient.

It is an object of the present invention to provide a self-adhesive prepreg with high draping property that can increase the adhesion between the surface material and the honeycomb core.

Solution to Problem

The present inventors have found out the solution to the problem by the use of the prepreg that is formed by producing a base prepreg including reinforcing fibers and a thermosetting resin composition (I) that is impregnated partially or entirely into a reinforcing fiber layer formed of the reinforcing fibers, and laminating an adhesive layer including a nonwoven fabric and a thermosetting resin composition (II) on a surface of the base prepreg so as to be integrated, and thus, the present invention has been completed.

The present invention for achieving the above object has the following aspects.

[1] A self-adhesive prepreg including:

a base prepreg including reinforcing fibers, and a thermosetting resin composition (I) that is partially or entirely impregnated into a reinforcing fiber layer that is formed of the reinforcing fibers; and an adhesive layer including a nonwoven fabric that is laminated on at least one surface of the base prepreg so as to be integrated with the base prepreg, and a thermosetting resin composition (II) that is laminated on a surface of the nonwoven fabric so as to be integrated with the nonwoven fabric.

In the self-adhesive prepreg according to the present invention, the base prepreg, which includes the reinforcing fiber layer formed of the reinforcing fibers, and the thermosetting resin composition (I) that is partially or entirely impregnated into the reinforcing fiber layer, the nonwoven fabric, and the thermosetting resin composition (II) are laminated in this order so as to be integrated.

This self-adhesive prepreg is laminated on the surface of the honeycomb core and cured; thus, the thermosetting resin composition (II) enters not just the periphery of the wall surface of the honeycomb core but also the entire opening on the surface of the honeycomb core in the layer form and is cured. Accordingly, the concentration of the stress on the periphery of the wall surface of the honeycomb core can be suppressed and the peeling strength can be improved.

The prepreg according to the present invention preferably has the following aspects.

[2] The self-adhesive prepreg according to [1], in which the base prepreg contains the thermosetting resin composition (I) by 30 to 50% by mass.

According to [2] of the present invention, the honeycomb laminated composite material to be obtained can be reduced in weight.

[3] The self-adhesive prepreg according to [1], in which each of the thermosetting resin composition (I) and the thermosetting resin composition (II) is an epoxy resin composition.

According to [3] of the present invention, the thermosetting resin in the prepreg is the epoxy resin; thus, the physical properties of the honeycomb laminated composite material can be improved easily.

[4] The self-adhesive prepreg according to [1], in which the thermosetting resin composition (I) and the thermosetting resin composition (II) have the same composition.

According to [4] of the present invention, the thermosetting resin composition (I) of the base prepreg and the thermosetting resin composition (II) of the adhesive layer have the same composition and are highly compatible; thus, the physical properties of the honeycomb laminated composite material can be improved easily.

[5] The self-adhesive prepreg according to [1], in which the nonwoven fabric has a 10%-extension load of 35 N or less.

According to [5] of the present invention, the draping property of the nonwoven fabric is excellent; thus, the draping property of the entire prepreg is excellent.

[6] The self-adhesive prepreg according to [1], in which the nonwoven fabric has a mass per unit area of 10 to 50 g/m$^2$.

According to [6] of the present invention, the draping property of the nonwoven fabric is excellent; thus, the draping property of the entire prepreg is excellent.

[7] The self-adhesive prepreg according to [1], in which the thermosetting resin composition (II) has a mass per unit area of 100 to 300 g/m$^2$.

According to [7] of the present invention, the adhesive layer that is in direct contact with the honeycomb core contains the thermosetting resin (II) in large amount. Therefore, the thermosetting resin composition (II) enters not just the periphery of the wall surface of the honeycomb core but also the entire opening on the surface of the honeycomb core in the layer form and is cured. Accordingly, the concentration of the stress on the periphery of the wall surface of the honeycomb core can be suppressed and the peeling strength can be improved.

[8] The self-adhesive prepreg according to [1], in which in the adhesive layer, the thermosetting resin composition (II) concentrates on a side of a surface of the adhesive layer opposite to a surface thereof that is in contact with the base prepreg.

According to [8] of the present invention, the thermosetting resin composition (II) exists more on the side of the surface of the self-adhesive prepreg that is in contact with the honeycomb core. Therefore, the thermosetting resin composition (II) easily enters the entire opening on the surface of the honeycomb core in the layer form.

[9] A method for producing the self-adhesive prepreg according to [1], the method including:

obtaining the base prepreg by impregnating the thermosetting resin composition (I) into the reinforcing fiber layer; and laminating the adhesive layer including the nonwoven fabric and the thermosetting resin composition (II) on the surface of the prepreg so as to be integrated with the base prepreg.

[10] A method for producing a honeycomb laminated composite material, the method including molding a honeycomb core laminate, in which the self-adhesive prepreg according to [1] and a honeycomb core are laminated, by applying heat and pressure.

[11] A honeycomb laminated composite material including a honeycomb core, and a cured body of the self-adhesive prepreg according to [1] that is laminated on a surface of the honeycomb core so as to be attached to the honeycomb core.

Advantageous Effects of Invention

The self-adhesive prepreg according to the present invention is laminated on the honeycomb core and cured; thus, not just fillet is formed on the periphery of the wall surface of the honeycomb core but also the thermosetting resin composition enters the entire opening on the surface of the honeycomb core in the layer form and is cured. Accordingly, the concentration of the stress only on the periphery of the wall surface of the honeycomb core can be suppressed and the honeycomb laminated composite material with the high peeling strength can be produced. In addition, the self-adhesive prepreg according to the present invention has high draping property; therefore, even if the honeycomb core has other surface shape than the planar shape, the self-adhesive prepreg can be in close contact following the surface shape of the honeycomb core.

BRIEF DESCRIPTION OF DRAWINGS

FIG. 1 is a schematic cross-sectional view illustrating one example of a self-adhesive prepreg according to the present invention.

FIG. 2 is a conceptual diagram illustrating one example of a process for producing the self-adhesive prepreg according to the present invention.

FIG. 3 is an explanatory view illustrating a cross section of a honeycomb laminated composite material produced using the self-adhesive prepreg according to the present invention.

FIG. 4 is an explanatory view illustrating a cross section of a honeycomb laminated composite material produced using a conventional self-adhesive prepreg.

FIG. 5 is a photograph corresponding to a drawing illustrating a cross section near a surface of the honeycomb laminated composite material produced using the self-adhesive prepreg according to the present invention.

FIG. 6 is a photograph corresponding to a drawing illustrating a cross section near a surface of the honeycomb laminated composite material produced using the conventional self-adhesive prepreg.

FIG. 7 is a photograph corresponding to a drawing illustrating a surface of a honeycomb core when a surface material has been separated from the honeycomb laminated composite material produced using the self-adhesive prepreg according to the present invention.

FIG. 8 is a photograph corresponding to a drawing illustrating a surface of a honeycomb core when the surface material has been separated from the honeycomb laminated composite material produced using the conventional self-adhesive prepreg.

FIG. 9(a) is a front view and FIG. 9(b) is a side view, both illustrating a die used to evaluate the draping property.

REFERENCE SIGNS LIST

100 Self-adhesive prepreg
11 Base prepreg
13 Nonwoven fabric
15 Thermosetting resin composition (II) layer
21 Reinforcing fiber layer
23 Resin sheet supply roll
25 Thermal roller
27 Cooling zone
29 Release paper collecting roll
31 Base prepreg
33 Adhesive layer sheet supply roll
35 Release paper collecting roll
37 Self-adhesive prepreg
39 Release film supply roll
41 Product winding roll
A Arrow indicating a direction where reinforcing fiber layer is advanced
50, 90 Honeycomb laminated composite material
51, 91 Honeycomb core
53, 93 Surface material
55, 95 Fillet
57 Resin layer

DESCRIPTION OF EMBODIMENTS

A self-adhesive prepreg according to the present invention is hereinafter described in detail.

1. Structure of Self-Adhesive Prepreg

A self-adhesive prepreg according to the present invention (hereinafter also referred to as "present prepreg") includes:

a base prepreg including reinforcing fibers and a thermosetting resin composition (I) that is partially or entirely impregnated into a reinforcing fiber layer formed of the reinforcing fiber; and an adhesive layer including a nonwoven fabric laminated on at least one surface of the base prepreg so as to be integrated with the base prepreg, and a thermosetting resin composition (II) that is laminated on a surface of the nonwoven fabric so as to be integrated with the nonwoven fabric. That is to say, the self-adhesive prepreg according to the present invention is formed in a manner that:

the base prepreg including the reinforcing fiber layer formed of the reinforcing fibers and the thermosetting resin composition (I) that is partially or entirely impregnated into the reinforcing fiber layer, the nonwoven fabric, and the thermosetting resin composition (II)

are laminated in this order so as to be integrated.

FIG. 1 is a schematic cross-sectional view illustrating one example of the present prepreg. In FIG. 1, the present prepreg is denoted by 100, and the base prepreg is denoted by 11. The base prepreg 11 includes the reinforcing fiber layer and the thermosetting resin composition (I) that is impregnated into the reinforcing fiber layer. On a surface of the base prepreg 11, an adhesive layer including a nonwoven fabric 13 and a thermosetting resin composition (II) layer 15 is laminated so as to be integrated.

1.1 Base Prepreg

The base prepreg includes the reinforcing fibers and the thermosetting resin composition (I) that is partially or entirely impregnated into the reinforcing fiber layer formed of the reinforcing fibers.

The base prepreg has a thickness of preferably 50 to 1000 μm, more preferably 60 to 500 μm. When the thickness of the base prepreg is in this range, the prepreg that is more easily handled in the molding can be obtained.

(1) Reinforcing Fiber Layer

Examples of the reinforcing fibers that form the reinforcing fiber layer of the present prepreg include carbon fiber, glass fiber, aramid fiber, silicon carbide fiber, polyester fiber, ceramic fiber, alumina fiber, boron fiber, metal fiber, mineral fiber, rock fiber, and slag fiber. Among these kinds of reinforcing fibers, carbon fiber, glass fiber, and aramid fiber are preferable, and carbon fiber is more preferable because the specific strength and the specific modulus are favorable and a lightweight and highly strength honeycomb laminated composite material can be obtained. Among various kinds of carbon fibers, polyacrylonitrile (PAN) carbon fiber with excellent tensile strength is particularly preferable.

In the case of using carbon fiber as the reinforcing fiber, the tensile modulus is preferably 170 to 600 GPa, particularly preferably 220 to 450 GPa. The tensile strength is preferably 3920 MPa (400 kgf/mm$^2$) or more. By using such carbon fiber, the mechanical performance of the honeycomb laminated composite material can be improved further.

The reinforcing fibers preferably have a sheet shape to be used. A sheet of the reinforcing fibers may be, for example, a sheet in which a number of reinforcing fibers are aligned in one direction, or a woven fabric such as a plain fabric or a twill fabric. The sheet is preferably a woven fabric because the expansion and contraction in a particular direction are possible and the draping property is excellent. The thickness of the reinforcing fiber layer is preferably 0.01 to 3 mm, more preferably 0.1 to 1.5 mm. The mass per unit area of the sheet is preferably 70 to 400 g/m², more preferably 100 to 300 g/m². These reinforcing fiber sheets may contain a known sizing agent.

(2) Thermosetting Resin Composition (I)

The thermosetting resin composition (I) that forms the self-adhesive prepreg according to the present invention contains the thermosetting resin as a necessary component, and may further contain a curing agent, a thermoplastic resin, a thickening particle, or other components.

The thermosetting resin composition (I) has a minimum resin viscosity of preferably 0.1 to 1000 Poise, more preferably 1 to 100 Poise, much more preferably 2 to 50 Poise, and particularly preferably 5 to 10 Poise from the viewpoint of impregnation into a reinforcing fiber base material. The minimum resin viscosity is the minimum viscosity measured based on the temperature-viscosity curve described in Examples bellow.

The base prepreg contains the thermosetting resin composition (I) by preferably 30 to 50% by mass, more preferably 31 to 45% by mass, and particularly preferably 35 to 40% by mass. If the content is 30 to 50% by mass, the prepreg with the high draping property and the honeycomb laminated composite material with small weight can be obtained. If the content is less than 30% by mass, the amount of resin impregnated into the reinforcing fiber layer of the prepreg becomes insufficient and a void or the like may be generated on a surface material of the honeycomb laminated composite material to be obtained. If the content is more than 50% by mass, the draping property of the prepreg may decrease or the strength of the honeycomb laminated composite material to be obtained may deteriorate.

(2-1) Thermosetting Resin

Examples of the thermosetting resin used in the present invention include epoxy resin, unsaturated polyester resin, vinyl ester resin, phenol resin, melamine resin, polyurethane resin, silicon resin, maleimide resin, cyanate ester resin, resin in which maleimide resin and cyanate ester resin are pre-polymerized, and the like. A mixture of these kinds of resin can be used. Among these examples, epoxy resin that is superior in heat resistance, elastic modulus, and chemical resistance is preferable.

Examples of the epoxy resin include bifunctional epoxy resin such as bisphenol epoxy resin, alcohol epoxy resin, biphenyl epoxy resin, hydrophthalate epoxy resin, dimer acid epoxy resin, and alicyclic epoxy resin; glycidyl ether epoxy resin such as tetrakis(glycidyloxyphenyl)ethane and tris(glycidyloxyphenyl)methane; glycidyl amine epoxy resin such as tetraglycidyl diamino diphenyl methane; naphthalene epoxy resin; phenol novolac epoxy resin that is novolac epoxy resin; and cresol novolac epoxy resin.

Furthermore, multifunctional epoxy resin such as phenol epoxy resin is given as the example. Various kinds of modified epoxy resin such as urethane modified epoxy resin and rubber modified epoxy resin can be used.

In particular, it is preferable to use epoxy resin with an aromatic group in a molecule, and more preferable to use epoxy resin including a glycidyl amine structure or a glycidyl ether structure. Furthermore, alicyclic epoxy resin can also be used suitably.

Examples of the epoxy resin including the glycidyl amine structure include various isomers of N,N,N',N'-tetraglycidyldiaminodiphenylmethane, N,N,O-triglycidyl-p-aminophenol, N,N,O-triglycidyl-m-aminophenol, N,N,O-triglycidyl-3-methyl-4-aminophenol, and triglycidylaminocresol.

Examples of the epoxy resin including the glycidylether structure include bisphenol A epoxy resin, bisphenol F epoxy resin, bisphenol S epoxy resin, phenol novolac epoxy resin, and cresol novolac epoxy resin.

These examples of epoxy resin may have a non-reactive substituent in an aromatic ring structure as necessary. Examples of such a non-reactive substituent include alkyl groups such as a methyl group, an ethyl group, and an isopropyl group, aromatic groups such as a phenyl group, an alkoxyl group, an aralkyl group, and halogen groups such as chlorine and bromine.

Examples of the bisphenol epoxy resin include bisphenol A resin, bisphenol F resin, bisphenol AD resin, and bisphenol S resin. Specific examples include jER815 (product name), jER828 (product name), jER834 (product name), jER1001 (product name), and jER807 (product name) that are produced by Mitsubishi Chemical Corporation, EPOMIK R-710 (product name) produced by Mitsui Chemicals, and EXA1514 (product name) produced by DIC Corporation.

Examples of the alicyclic epoxy resin include Araldite CY-179 (product name), CY-178 (product name), CY-182 (product name), and CY-183 (product name) that are produced by Huntsman Corporation.

Examples of the multifunctional epoxy resin include jER152 (product name), jER154 (product name), and jER604 (product name) that are produced by Mitsubishi Chemical Corporation, DEN431 (product name), DEN485 (product name), and DEN438 (product name) that are produced by Dow Chemical Company, and EPICLON N740 (product name) produced by DIC Corporation. Examples of the cresol novolac epoxy resin include Araldite ECN1235 (product name), ECN1273 (product name), and ECN1280 (product name) that are produced by Huntsman Corporation, EOCN102 (product name), EOCN103 (product name), and EOCN104 (product name) that are produced by Nippon Kayaku Co., Ltd.

Examples of various kinds of modified epoxy resin include Adeka resin EPU-6 (product name) and EPU-4 (product name) as urethane modified bisphenol A epoxy resin that are produced by Asahi Denka Co., Ltd.

Any of these examples of epoxy resin may be used alone or two or more kinds thereof may be mixed to be used. Among these examples, the bifunctional epoxy resin typified by bisphenol type varies in grade from liquid to solid depending on the molecular weight. Therefore, these kinds of resin are preferably mixed for the purpose of adjusting the viscosity of the resin composition.

(2-2) Curing Agent

Examples of the curing agent that can be used in the present invention include dicyandiamide, various isomers of aromatic amine curing agents, and an imidazole compound. Dicyandiamide (DICY) that is the amide curing agent, and the imidazole compound are preferable because of being superior in curing property and physical properties after the curing. In order to obtain higher heat resistance, diaminodiphenyl sulfone (DDS) or diaminodiphenylmethane (DDM) can be used alone or in mixture; from the point of achieving the heat resistance, a derivative of DDS is preferable.

Specific examples of dicyandiamide (DICY) include jER CURE DICY7 and DICY15 produced by Mitsubishi Chemical Corporation. Specific examples of diaminodiphenyl sulfone (DDS) include 4,4'-DDS produced by Wakayama Seika Kogyo Co., Ltd. and 4,4'-DDS and 3,3'-DDS produced by Tokyo Chemical Industry Co., Ltd.

In the case of using DICY, it is more preferable that DICY is used in combination with a urea curing agent. Since DICY is not very highly soluble in the epoxy resin, sufficient dissolving requires heating at high temperature of 160° C. or more. However, using the urea curing agent in combination makes it possible to decrease the dissolving temperature.

Examples of the urea curing agent include phenyldimethylurea (PDMU), toluenebisdimethylurea (TBDMU), and dichlorophenyldimethylurea (DCMU).

The thermosetting resin composition preferably contains the curing agent by 5 to 30 parts by mass per 100 parts by mass of thermosetting resin. If the curing agent is contained by 5 parts by mass or more, the crosslinking density is sufficient and sufficient curing speed is achieved. If the curing agent is contained by 30 parts by mass or less, the decrease in mechanical property of, or the turbidity of the curing resin due to the excessive presence of the curing agent can be suppressed.

In the case of using DICY and the urea curing agent (PDMU, TBDMU, DCMU, or the like) as the curing agent, it is preferable that DICY is contained by 1 to 15 parts by mass and the urea curing agent is contained by 1 to 10 parts by mass per 100 parts by mass of the epoxy resin (note that the total amount of DICY and the urea curing agent is 2 to 20 parts by mass).

Examples of the imidazole compound include an imidazole compound whose hydrogen in the 5-position of 1H-imidazole is substituted by a hydroxymethyl group and hydrogen in the 2-position is substituted by a phenyl group or a toluyl group, such as 2-phenyl-4,5-dihydroxymethylimidazole, 2-phenyl-4-methyl-5-hydroxymethylimidazole, 2-phenyl-4-benzyl-5-hydroxymethylmidazole, 2-paratoluyl-4-methyl-5-hydroxymethylmidazole, 2-metatoluyl-4-methyl-5-hydroxymethylimidazole, 2-metatoluyl-4,5-dihydroxymethylimidazole, and 2-paratoluyl-4,5-dihydroxymethylimidazole. Among these examples, 2-phenyl-4,5-dihydroxymethylimidazole, 2-phenyl-4-methyl-5-hydroxymethylimidazole, 2-paratoluyl-4-methyl-5-hydroxymethylmidazole, 2-metatoluyl-4-methyl-5-hydroxymethylmidazole, 2-metatoluyl-4,5-dihydroxymethylimidazole, and 2-paratoluyl-4,5-dihydroxymethylimidazole are more preferable.

In addition, 1-(2-hydroxy-3-phenoxypropyl)-2-methylimidazole and an adduct compound resulting from the reaction between glycidyl ether thermosetting resin and 2-methylimidazole are given. Among them, the adduct compound resulting from the reaction between aryl glycidyl ether thermosetting resin and 2-methylimidazole is preferable because the physical property of the cured thermosetting resin composition can be enhanced. In the case of using the imidazole compound as the curing agent, the imidazole compound is contained by preferably 2 to 30 parts by mass, more preferably 3 to 15 parts by mass per 100 parts by mass of the thermosetting resin.

(2-3) Thermoplastic Resin

In the present invention, the thermosetting resin composition may contain thermoplastic resin. The thermoplastic resin has an effect of improving the impact resistance of the honeycomb laminated composite material to be obtained, or accelerating the formation of fillet, which will be described below, by causing the thermosetting resin composition to have proper viscosity.

Examples of the thermoplastic resin include soluble thermoplastic resin such as polyether sulfone, polysulfone, polyether imide, and polycarbonate. Any of these examples may be used alone or two or more kinds thereof may be used in combination. Polyether sulfone or polysulfone with a weight-average molecular weight (Mw), which is measured by gel permeation chromatography (GPC), of 8000 to 40000 is particularly preferable.

The amount of thermoplastic resin contained in the thermosetting resin composition is different depending on the kind of the thermosetting resin to be used for the thermosetting resin composition, and may be adjusted as appropriate so that the thermosetting resin composition has proper viscosity. If the thermosetting resin is epoxy resin, the thermoplastic resin that is soluble in the epoxy resin is contained by preferably 5 to 90 parts by mass, more preferably 5 to 50 parts by mass, and much more preferably 10 to 40 parts by mass per 100 parts by mass of the epoxy resin. If the content is less than 5 parts by mass, the impact resistance of the honeycomb laminated composite material to be obtained may be insufficient. If the content is more than 90 parts by mass, the viscosity becomes drastically high and it may become remarkably difficult to handle the prepreg.

As the thermoplastic resin, insoluble thermoplastic resin such as polyamide, polyacetal, polyphenylene oxide, polyphenylene sulfide, polyester, polyamideimide, polyimide, polyether ketone, polyether ether ketone, polyethylene naphthalate, polyether nitrile, or polybenzimidazole can be mixed. Among these examples, polyamide, polyamideimide, and polyimide are preferable because the toughness and the heat resistance are high. Polyamide and polyimide are superior in effect of improving the toughness. Any of these examples may be used alone or two or more kinds thereof may be used in combination. A copolymer thereof may be used.

If the thermosetting resin is the epoxy resin, the thermoplastic resin that is insoluble in the epoxy resin is contained by preferably 5 to 60 parts by mass, more preferably 15 to 40 parts by mass per 100 parts by mass of the epoxy resin. If the content is less than 5 parts by mass, the impact resistance of the honeycomb laminated composite material to be obtained may be insufficient. If the content is more than 60 parts by mass, the impregnation into the reinforcing fiber layer or the draping property of the prepreg to be obtained may become lower.

(2-4) Thickening Particle

In the present invention, the thermosetting resin composition may contain a thickening particle. The thickening particle has an effect of keeping the proper viscosity of the resin composition in the thermal curing and forming the fillet stably. An example of the thickening particle is a particle formed by copolymerization between one or a plurality of unsaturated compounds and a crosslinking monomer. Although not limited to a particular kind, the thickening particle desirably contains the resin in which at least one kind of an acrylic acid ester compound, a methacrylic acid ester compound, and a vinyl compound is the monomer unit.

The acrylic acid ester compound used for the thickening particle is a compound with an acrylic acid ester structure and its derivative, and examples thereof include methyl acrylate, ethyl acrylate, n-propyl acrylate, isopropyl acrylate, n-butyl acrylate, isobutyl acrylate, sec-butyl acrylate, t-butyl acrylate, n-hexyl acrylate, and cyclohexyl acrylate.

The methacrylic acid ester compound used for the thickening particle is a compound with a methacrylic acid ester structure and its derivative, and examples thereof include methyl methacrylate, ethyl methacrylate, n-propyl methacrylate, isopropyl methacrylate, n-butyl methacrylate, n-hexyl methacrylate, and cyclohexyl methacrylate.

The vinyl compound used for the thickening particle is a compound with a vinyl structure that is polymerizable, and examples thereof include styrene, α-methyl styrene, divinylbenzene, and these compounds whose aromatic ring is substituted by various functional groups such as an alkyl group or a halogen atom.

Other examples of the thickening particle include polymer formed by one kind or two or more kinds of polymer units of the methacrylic acid ester compound, the acrylic acid ester compound, and the vinyl compound, and resin in which two or more kinds of resin with different structures are mixed. In addition, the thickening particle may be composite resin that is formed in a manner that:

(i) a polymer including at least one kind of the acrylic acid ester compound or the methacrylic acid ester compound, and a diene compound, and (ii) a polymer including the acrylic acid ester compound or the methacrylic acid ester compound, and radical polymerizable unsaturated carboxylic acid are cross-linked with ions by addition of (iii) metal ions.

The thickening particle is preferably the polymer including one kind or two or more kinds of polymer units selected from the group consisting of the methacrylic acid ester compound, the acrylic acid ester compound, and the vinyl compound, and more preferably the methacrylic acid alkyl polymer.

The thickening particle preferably has an average polymerization degree of 4,000 to 40,000.

As the thickening particle, it is also preferable to use a commercial product including the methacrylic acid alkyl polymer without a core-shell structure, such as ZEFIAC F325 or ZEFIAC F320 (both products are made by Aica Kogyo Co., Ltd.). Note that the methacrylic acid alkyl polymer with a core-shell structure swells less easily in the thermosetting resin composition due to the shell structure, and the effect of increasing the viscosity is low; thus, this methacrylic acid alkyl polymer is not preferable.

The particle diameter and the like of the thickening particle are not limited to particular values; however, the average particle diameter is preferably 0.3 to 10 μm, more preferably 0.5 to 8 μm. The thickening particle is contained by preferably 2 to 20 parts by mass, more preferably 3 to 18 parts by mass, and particularly preferably 4 to 15 parts by mass per 100 parts by mass of the epoxy resin.

The thickening particle dispersed in the epoxy resin swells in the epoxy resin as heat is applied. The thickening particle swells more in accordance with the temperature and the time, and as the thickening particle swells, the viscosity of the epoxy resin drastically increases. Regarding the degree of thickening, the viscosity increases from the minimum viscosity as the temperature rises, and it is preferable that the viscosity of the resin composition at 120° C. is 50 to 300 poise from the viewpoint of forming the fillet and suppressing the flow in the molding.

Before the thickening particle swells, the epoxy resin has the low viscosity and therefore, the impregnation into the reinforcing fiber base material layer is excellent. When the thickening particle swells and the viscosity of the epoxy resin increases in the reinforcing fiber base material layer, the resin flow in the molding is suppressed. As a result, the resin impregnation and the suppression of the resin flow can be achieved in high level.

(2-5) Other Components

The thermosetting resin composition that can be used in the present invention may contain other additives unless the purpose and effect of the present invention are deteriorated. Examples of the other components include curing accelerators including amine compounds such as tertiary amine and imidazole, phosphoric compounds such as phosphines and phosphonium, and N,N-dimethyl urea derivatives; reactive diluents; fillers; antioxidants; retardants; pigments; and other various additives. These components may be mixed by a known amount.

1.2 Adhesive Layer

In the self-adhesive prepreg according to the present invention, the adhesive layer including the nonwoven fabric and the thermosetting resin composition (II) laminated on the surface of the nonwoven fabric so as to be integrated is laminated on at least one surface of the base prepreg described above so as to be integrated.

In the adhesive layer, it is preferable that the thermosetting resin composition (II) concentrates on a side opposite to the surface thereof in contact with the base prepreg. That is to say, it is preferable that the thermosetting resin composition (II) concentrates on the side of the surface in contact with the honeycomb core.

Since the thermosetting resin composition (II) concentrates on the side of the surface in contact with the honeycomb core, the thermosetting resin composition (II) easily enters in the layer form near the surface of the opening of the honeycomb core. Therefore, the adhesion interface between the honeycomb core and the self-adhesive prepreg can be increased; accordingly, the concentration of the stress in the fillet part can be suppressed.

(1) Nonwoven Fabric

The nonwoven fabric used for the self-adhesive prepreg according to the present invention is formed of thermoplastic resin with a melting point of such a degree that the resin is not melted in the thermal molding. A preferable example of the main material of the nonwoven fabric is polyethylene terephthalate (hereinafter also referred to as "PET") because of having heat resistance and fire resistance.

The thickness of the nonwoven fabric is preferably 0.1 to 1.0 mm, more preferably 0.12 to 0.5 mm, and particularly preferably 0.15 to 0.3 mm. If the thickness is less than 0.1 mm, the effect of keeping the thermosetting resin composition near the opening on the surface of the honeycomb core tends to be low. If the thickness is more than 1.0 mm, some thermosetting resin may fail to be impregnated into the layer of the nonwoven fabric after the pressure molding.

The load required to extend the nonwoven fabric with a width of 50 mm by 10% in a length direction (this load is herein defined as "10%-extension load") is 35 N or less, and preferably 32 N or less. If the load is more than 35 N, the draping property of the nonwoven fabric is low and the draping property of the self-adhesive prepreg to be obtained tends to decrease. The lower limit value of the 10%-extension load is not limited to a particular value and is preferably 1 N or more, more preferably 2 N or more. If the load is less than 1 N, it becomes difficult to handle the nonwoven fabric.

A method for producing the nonwoven fabric as above is not limited to a particular method; for example, a commercial nonwoven fabric may be punched with a needle so that the 10%-extension load becomes 35 N or less.

The mass per unit area of the nonwoven fabric is preferably 10 to 50 g/m$^2$, more preferably 15 to 45 g/m$^2$, and particularly preferably 20 to 40 g/m$^2$. If the mass per unit area is more than 50 g/m$^2$, the flowing of the resin is interrupted easily in the thermal molding. If the mass per unit area is less than 10 g/m$^2$, it becomes difficult to handle the nonwoven fabric.

(2) Thermosetting Resin Composition (II)

The thermosetting resin composition (II) that forms the self-adhesive prepreg according to the present invention includes the thermosetting resin as the necessary component, and may include the curing agent, the thermoplastic resin or other components. These components may be the same as those described above about the thermosetting resin composition (I).

The minimum resin viscosity of the thermosetting resin composition (II) is preferably 0.1 to 1000 Poise, more preferably 1 to 100 Poise, much more preferably 2 to 50 Poise, and particularly preferably 5 to 10 Poise. The viscosity at 80° C. is preferably 0.5 to 3000 Poise, more preferably 2 to 1000 Poise, much more preferably 5 to 500 Poise, and particularly preferably 10 to 200 Poise. If the resin viscosity is too low, in the lamination on the honeycomb core, the effect of keeping the thermosetting resin composition near the opening on the surface of the honeycomb core tends to be lower. If the resin viscosity is too high, the draping property of the prepreg may decrease or the formation of the fillet in the honeycomb laminated composite material to be obtained may be insufficient.

In the self-adhesive prepreg according to the present invention, the thermosetting resin composition (I) and the thermosetting resin composition (II) are mixed at the time of pressure molding. Therefore, it is preferable that the thermosetting resin composition (I) and the thermosetting resin composition (II) are highly compatible. In addition, it is preferable that the thermosetting resin composition (I) and the thermosetting resin composition (II) are formed of the similar thermosetting resin, more preferably the same epoxy resin, and particularly preferably the same composition.

In the self-adhesive prepreg according to the present invention, the mass ratio between the thermosetting resin composition (I) and the thermosetting resin composition (II) is preferably 20:1 to 1:1, more preferably 10:1 to 5:1.

The content of the thermosetting resin composition (II) is preferably 100 to 300 g/m$^2$, more preferably 150 to 250 g/m$^2$, much more preferably 160 to 220 g/m$^2$, and particularly preferably 180 to 200 g/m$^2$. If the resin content is too low, it may be difficult to supply a sufficient amount of thermosetting resin composition near the opening on the surface of the honeycomb core. As a result, the resin layer cannot be formed near the opening on the surface of the honeycomb core and stress concentrates on the fillet part; thus, the peeling strength of the surface material tends to become lower. If the resin content is too high, the effect of reducing the weight tends to become lower.

2. Method for Producing Self-Adhesive Prepreg

The self-adhesive prepreg according to the present invention is produced by a step of producing the base prepreg by impregnating the thermosetting resin composition (I) partially or entirely into the reinforcing fiber layer, and a step of laminating the adhesive layer including the nonwoven fabric and the thermosetting resin composition (II) on the surface of the base prepreg so as to integrate the both.

(1) Production of Base Prepreg

The base prepreg is produced by impregnating the thermosetting resin composition (I) partially or entirely into the reinforcing fiber layer. One example of the impregnating method is a dry process in which the resin composition with the viscosity decreased by heating is impregnated into the reinforcing fiber layer. This dry process is superior to a wet process in which the resin composition is dissolved in an organic solvent, the solution is impregnated into the reinforcing fiber layer and then, the organic solvent is removed, because the organic solvent is not left in the dry process. The method of producing the base prepreg by the dry process is described below.

(1-1) Production of Thermosetting Resin Composition (I)

The thermosetting resin composition (I) can be produced by kneading the necessary components described above and an arbitrary component. The kneading temperature is controlled in consideration of the viscosity, the thermal characteristic, the curing temperature, or the like of the resin to be mixed, and is less than or equal to the curing start temperature, and is preferably 50 to 120° C. The kneading may be performed in one step or multiple steps. The order of mixing the components is not limited to a particular order. The kneading machine may be a conventionally known machine such as a roll mill, a planetary mixer, a kneader, an extruder, or a Banbury mixer.

(1-2) Production of Sheet of Thermosetting Resin Composition (I)

A resin sheet formed of the thermosetting resin composition (I) can be produced by a known method. For example, the sheet can be produced by flow casting or casting on a support body such as release paper or a release sheet using a die coater, an applicator, a reverse roll coater, a comma coater, a knife coater, or the like. The resin temperature in the formation of the sheet is set as appropriate in accordance with the composition or the viscosity of the resin.

The thickness of the resin sheet is preferably 2 to 500 μm, more preferably 5 to 100 μm.

Next, the obtained resin sheet is impregnated into the reinforcing fiber layer. The impregnation is performed by having the resin sheet laminated on one surface or both surfaces of the reinforcing fiber layer and this laminate is heated and pressed. By performing the heat treatment with pressure, the thermosetting resin composition (I) that forms the resin sheet has lower viscosity and is impregnated into the space in the reinforcing fiber layer.

The heating temperature of the impregnating process can be adjusted as appropriate in consideration of the viscosity, the curing temperature, or the like of the thermosetting resin composition (I). The heating temperature is preferably 70 to 160° C., more preferably 90 to 140° C. If the impregnating temperature is less than 70° C., the thermosetting resin composition (I) has high viscosity and therefore it is difficult to impregnate the thermosetting resin composition (I) into the reinforcing fiber layer. If the impregnating temperature is more than 160° C., the thermosetting resin composition (I) is easily cured. As a result, the draping property of the prepreg to be obtained easily deteriorates.

The time of the impregnating process is preferably 10 to 300 seconds.

The pressing condition in the impregnating process is adjusted as appropriate in accordance with the composition or the viscosity of the thermosetting resin composition (I); preferably, the linear pressure is 9.8 to 245 N/cm (1 to 25 kg/cm), more preferably 19.6 to 147 N/cm (2 to 15 kg/cm). If the line pressure is less than 9.8 N/cm, it is difficult to sufficiently impregnate the thermosetting resin composition (I) into the reinforcing fiber layer. If the line pressure is more than 245 N/cm, the reinforcing fiber is easily damaged.

The impregnating process may be performed by a conventional method that uses a thermal roller or the like. The impregnating process may be performed once or a plurality of times. Thus, the base prepreg in which an epoxy resin composition [B] is impregnated into the reinforcing fiber layer is produced.

(1-3) Production of Adhesive Layer

The adhesive layer includes the nonwoven fabric and the thermosetting resin composition (II). The adhesive layer can be produced by laminating a sheet of the thermosetting resin composition (II) on the nonwoven fabric. Alternatively, the adhesive layer can be produced by applying the thermosetting resin composition (II) in the melted state on the surface of the nonwoven fabric. As described above, it is preferable that the thermosetting resin composition (II) concentrates on the side of the surface in contact with the surface of the honeycomb core in the self-adhesive prepreg according to the present invention. The degree of concentration is not limited to the particular degree; however, it is preferable that the thermosetting resin composition (II) exists on the side of the surface in contact with the surface of the honeycomb core by more than 50% by mass, more preferably more than 60% by mass. The concentration as described above can be realized by laminating the sheet of the thermosetting resin composition (II) on the side of the surface of the nonwoven fabric that is in contact with the surface of the honeycomb core. This method is described below.

(1-3-1) Production of Sheet of Thermosetting Resin Composition (II)

The sheet of the thermosetting resin composition (II) can be produced in a manner similar to the sheet of thermosetting resin composition (I) described above.

(1-3-2) Integration of Nonwoven Fabric and Sheet of Thermosetting Resin Composition (II)

On the surface of the nonwoven fabric, the sheet of the thermosetting resin composition (II) is laminated, and heated and pressed as necessary; thus, a sheet of the adhesive layer in which the nonwoven fabric and the sheet of the thermosetting resin composition (II) are integrated is obtained.

On the surface of the base prepreg produced by the above method, the adhesive layer produced by the above method is laminated so as to be integrated; thus, the self-adhesive prepreg according to the present invention is produced.

FIG. 2 is an explanatory view illustrating a process for producing the self-adhesive prepreg according to the present invention. First, while a reinforcing fiber layer 21 formed of reinforcing fibers is advanced in an arrow A direction in the drawing, the resin sheets (with release paper) formed of the thermosetting resin composition (I) are supplied from resin sheet supply rolls 23 on both sides in the thickness direction of the reinforcing fiber layer 21 and are laminated on the reinforcing fiber layer 21. The reinforcing fiber layer 21 and the resin sheet are thermally pressed through the release paper using heat rollers 25. Through this thermal pressing, the thermosetting resin composition (I) is impregnated into the reinforcing fiber layer 21. After the impregnation, one release paper is wound into a release paper collecting roll 29 through a cooling zone 27 so as to be removed. Next, an adhesive layer sheet (with release paper) formed of the nonwoven fabric and the thermosetting resin composition (II) is supplied from an adhesive layer sheet supply roll 33 and laminated on one surface of the base prepreg 31 so as to be integrated. After that, the release paper is wound around a release paper collecting roll 35 so as to be removed. Thus, a self-adhesive prepreg 37 according to the present invention is produced. After a release film supplied from a release film supply roll 39 is laminated, the self-adhesive prepreg 37 is wound by a product winding roll 41.

3. How to Use Self-Adhesive Prepreg

By curing the present prepreg in accordance with a known method, CFRP can be produced. CFRP can be produced using the present prepreg in accordance with a conventionally known method such as manual layup, automated tape laying (ATL), automated fiber arrangement, vacuumbagging, autoclave curing, curing other than autoclave curing, fluid-assisted processing, pressure-assisted process, match mold process, simple press curing, press clave curing, or continuous band pressing.

In one example, the present prepreg is laminated and pressed at 0.2 to 1.0 MPa in an autoclave, and heated at 150 to 204° C. for 1 to 8 hours; thus, CFRP can be molded.

In particular, the present prepreg is the prepreg that is suitable for being laminated and cured on the surface of the opening of the honeycomb core. In general, after the self-adhesive prepreg according to the present invention is laminated on the surface of the opening of the honeycomb core, a known prepreg is further laminated as necessary and thermally cured with pressure; thus, the honeycomb laminated composite material can be produced. The honeycomb laminated composite material produced in this manner includes the structure including the honeycomb core and the cured body of the self-adhesive prepreg that is laminated on the surface of the honeycomb core and attached to the honeycomb core. Since the self-adhesive prepreg according to the present invention is laminated directly without the adhesive material layer, which has been conventionally used on the surface of the opening of the honeycomb core, the sufficient adhesion can be achieved.

The self-adhesive prepreg according to the present invention is laminated and cured on the surface of the honeycomb core; thus, not just the fillet is formed on the periphery of the wall surface of the honeycomb core but also the thermosetting resin composition (II) is impregnated into the vicinity of the opening on the surface of the honeycomb core in the layer form and cured. In addition, the self-adhesive prepreg in which the thermosetting resin composition (II) concentrates in a particular area also enables the integration of the thermosetting resin composition (I) and the thermosetting resin composition (II) by pressing and heating. Thus, the concentration of the stress on the periphery of the wall surface of the honeycomb core can be suppressed and the honeycomb laminated composite material with high peeling strength can be produced.

FIG. 3 is an explanatory view illustrating a cross section of the honeycomb laminated composite material produced using the self-adhesive prepreg according to the present invention. In FIG. 3, the honeycomb laminated composite material is denoted by 50, and each surface of a honeycomb core 51 is provided with a surface material 53 by adhesion. Fillet formed along the wall surface of the honeycomb core 51 is denoted by 55, and a resin layer formed in the layer form near the opening on the surface of the honeycomb core 51 is denoted by 57. Note that the nonwoven fabric is not shown. By using the self-adhesive prepreg according to the present invention, not just the fillet 55 but also the resin layer 57 can be formed; thus, the adhesion is improved. FIG. 5 is a photograph corresponding to a drawing illustrating the cross section of the honeycomb laminated composite material produced using the self-adhesive prepreg according to the present invention, and in this photograph, the structure of FIG. 3 can be observed. In addition, FIG. 7 is a photograph corresponding to a drawing illustrating the surface of the honeycomb core when the surface material has been separated from the honeycomb laminated composite material produced using the self-adhesive prepreg according to the present invention. The resin, which used to fill the opening of the honeycomb core, is still left, and the structure of FIG. 3 is observed.

One example of the method for producing the honeycomb laminated composite material is a method including: covering, with a film bag, the honeycomb core laminate in which the self-adhesive prepreg according to the present invention, the honeycomb core, and the self-adhesive prepreg according to the present invention are sequentially set in a lower die of the mold; sealing the honeycomb core laminate between the lower die and the film bag; vacuuming the space formed by the lower die and the film bag; and molding the honeycomb core laminate in an autoclave with heat and pressure. The preferable condition in the molding is: the temperature increasing speed is 1 to 50° C./min and the heating and pressing are performed at 0.1 to 0.7 MPa at 130 to 180° C. for 10 to 30 minutes. In order to increase the adhesion between the honeycomb core and the prepreg, it is preferable that the space between the lower die and the film bag is kept vacuum from room temperature to 80 to 100° C. and then, the vacuumed space is opened.

The conventionally known prepreg may further be laminated on the outside of the self-adhesive prepreg according to the present invention (on the side opposite to the surface in contact with the honeycomb core) in accordance with the mechanical characteristic that is required.

In the honeycomb laminated composite material obtained by curing the honeycomb core laminate in which the self-adhesive prepreg according to the present invention and the honeycomb core are laminated, the reinforcing fiber layer (surface material) including the reinforcing fibers and the thermosetting resin cured body, and the honeycomb core are attached together with the adhesive layer including the nonwoven fabric and the thermosetting resin cured body interposed therebetween. In the honeycomb laminated composite material obtained using the self-adhesive prepreg according to the present invention, the thermosetting resin of the adhesive layer forms the sufficient fillet between the surface material and the honeycomb core, and moreover, the thermosetting resin of the surface material and the thermosetting resin of the fillet are the same resin; therefore, the adhesion between the surface material and the honeycomb core is excellent.

EXAMPLES

The present invention is described in more detail with reference to examples; however, the present invention is not limited to the examples below. The components and test methods that are employed in examples and comparative examples are described below.

Reinforcing Fiber Base Material

Carbon fiber woven fabric "TENAX" W3101 (carbon fiber woven fabric produced by Toho Tenax Co., Ltd.) with a mass per unit area of 193 g/m$^2$ Epoxy Resin jER604 (product name): glycidyl diamine epoxy resin (tetrafunctional) produced by Mitsubishi Chemical Corporation (hereinafter abbreviated as "jER604")

jER828 (product name): bisphenol A epoxy resin (bifunctional) produced by Mitsubishi Chemical Corporation (hereinafter abbreviated as "jER828")

Thermoplastic Resin

PES-5003P (product name): polyether sulfone with an average particle diameter of 20 μm, produced by SUMITOMO CHEMICAL COMPANY, LIMITED (hereinafter abbreviated as "PES")

Curing Agent

Dicyandiamide: curing agent produced by Mitsubishi Chemical Corporation (hereinafter abbreviated as "DICY")

4,4'-diaminodiphenylsulfone: aromatic amine curing agent produced by Wakayama Seika Kogyo Co., Ltd. (hereinafter abbreviated as "DDS")

Curing Accelerator

Preventol A6: dichlorophenyldimethylurea (urea curing accelerator) produced by LANXESS (hereinafter abbreviated as "DCMU")

Thickening Particle

"ZEFIAC (registered trademark)" F320 (methacrylic acid alkyl polymer) with an average polymerization degree of 30,000, produced by Aica Kogyo Co., Ltd. (hereinafter abbreviated as "ZEFIAC")

Nonwoven Fabric

Nonwoven fabric 1: PET spunbond nonwoven fabric 90303WS0 produced by UNITIKA LTD., with a mass per unit area of 30 g/m$^2$ and a thickness of 0.21 mm Nonwoven fabric 2: PET spunbond nonwoven fabric EB030 30W produced by TUSCO (THAI UNITIKA SPUNBOND CO., LTD.), with a mass per unit area of 30 g/m$^2$ and a thickness of 0.18 mm Nonwoven fabric 3: PET spunbond nonwoven fabric 90403WSO produced by UNITIKA LTD., with a mass per unit area of 40 g/m$^2$ and a thickness of 0.25 mm

10%-Extension Load

The nonwoven fabric was cut by a width of 50 mm and a length of 200 mm, and the cut fabric at the ends was held by a clamp for 50 mm in the length direction. These ends were pulled using a load testing machine (autograph AG-100 kNX, SHIMADZU CORPORATION), and the load when the length was extended by 10% was measured.

If the nonwoven fabric had directivity, the value in the direction where the load was maximized was regarded as the 10%-extension load.

Viscosity

The rheometer ARES-RDA produced by Rheometrics was used and parallel plates with a diameter of 25 mm were used. With the thickness of the epoxy resin composition between the parallel plates set to 0.5 mm, the viscosity was measured at an angular speed of 10 radians/sec and with a temperature increasing speed of 2° C./min up to 180° C., and thus, the viscosity was measured from the temperature-viscosity curve.

Draping Property

The draping property was evaluated by a test of laying up (forming) the prepreg on the structure (die). To a die illustrated in FIG. 9(a) and FIG. 9(b), a square prepreg cut into the size a little larger than the die was laid up and the generated crease and the buckling state were evaluated with eyes. FIG. 9(a) is a front view of the die, FIG. 9(b) is a side view of the die, and in FIG. 9(a), the shape is symmetric vertically and horizontally. The die has a size of 180 mm along B, 68 mm along C, 9 mm along D, 118.5 mm along E, 280 mm along F, 22 mm along G, and 380 mm along H.

Peeling Strength

The drum peeling strength was measured by an evaluation method according to DIN EN2243-3.

Example 1

In a kneader, jER604 and jER828 were heated and mixed at 120° C. Into the obtained mixture, PES was added and mixed with heat at 120° C. in the kneader; thus, the mixture was dissolved completely. Subsequently, the obtained resin mixture was transferred to a roll mill, and DICY, DDS, and DCMU were added by the amount described below and kneaded sufficiently at 80° C.; thus, the epoxy resin composition according to the present Example was obtained. The minimum resin viscosity of this resin composition was 5 Poise, and 35 Poise at 120° C.

Content of Epoxy Resin Composition
jER604: 40 parts by mass
jER828: 60 parts by mass
PES: 20 parts by mass
DYCY: 2 parts by mass
DDS: 20 parts by mass
DCMU: 0.5 parts by mass This thermosetting resin composition was applied onto a release film using a film coater; thus, the resin sheet was obtained. Next, a carbon fiber woven fabric was supplied between the two resin sheets and heat and pressure were applied thereto at 100° C. using a roller; thus, the base prepreg was obtained. The base prepreg had a resin content of 35% by mass.

Next, this thermosetting resin composition was applied onto the release film using the film coater; thus, the resin sheet was obtained. On the surface of this resin sheet, the nonwoven fabric 1 was placed and thus, the adhesive layer sheet was produced.

After that, on the surface of this base prepreg, the adhesive layer sheet was laminated with the surface thereof containing much resin facing outward, and then pressure is applied thereto using the roller at 30° C.; thus, the self-adhesive prepreg was obtained. As a result of evaluating the draping property of the self-adhesive prepreg, there was a little resistance in laying up the prepreg to the die and it took some time and effort to lay up the prepreg. However, once the prepreg was laid up, the crease or the buckling did not occur in the prepreg and the prepreg was durable sufficiently during the use.

This self-adhesive prepreg was laminated on the honeycomb core (produced by EURO-COMPOSITES, ECK 4.8-37, thickness: 15 mm), and heat and pressure were applied thereto at 0.3 MPa and 180° C. for two hours; thus, the honeycomb laminated composite material was produced. The average peeling strength of the honeycomb laminated composite material was as sufficiently high as 23 N/cm.

Comparative Example 1

A base prepreg according to Comparative example 1 was produced in a manner similar to Example 1 except that the base prepreg contained resin by 44% by mass. In Comparative example 1, the nonwoven fabric and the resin sheet were not laminated on the surface of the base prepreg. Using this prepreg, the honeycomb laminated composite material was produced in a manner similar to Example 1. The average peeling strength of the honeycomb laminated composite material using the prepreg according to Comparative example 1 that did not include the adhesive layer was 9 N/cm, which was much lower than that of Example 1.

Comparative Example 2

A base prepreg according to Comparative example 2 was produced in a manner similar to Example 1 except that the base prepreg contained resin by 44% by mass. In Comparative example 2, only the resin sheet was laminated on the surface of the base prepreg and the nonwoven fabric was not laminated. Using this prepreg, the honeycomb laminated composite material was produced in a manner similar to Example 1. The average peeling strength of the honeycomb laminated composite material using the prepreg according to Comparative example 2 in which the adhesive layer did not include the nonwoven fabric was 14 N/cm, which was much lower than that of Example 1.

Comparative Example 3

A base prepreg according to Comparative example 3 was produced in a manner similar to Example 1 except that the base prepreg contained resin by 37% by mass. In Comparative example 3, only the nonwoven fabric 1 was laminated on the surface of the base prepreg and the resin sheet was not laminated. Using this prepreg, the honeycomb laminated composite material was produced in a manner similar to Example 1. The average peeling strength of the honeycomb laminated composite material using the prepreg according to Comparative example 3 in which the adhesive layer did not include the resin was 6 N/cm, which was much lower than that of Example 1.

Examples 2 and 3

Self-adhesive prepregs according to Examples 2 and 3 were produced and obtained in a manner similar to Example 1 except that the mass per unit area of the resin sheet was changed as shown in Table 1. Evaluating the draping property of the obtained self-adhesive prepregs indicates that both self-adhesive prepregs according to Examples 2 and 3 resisted a little when laid up to the die and it took some time and effort in the laying up work. However, after the lay-up, the crease or the buckling did not occur in the prepregs and the prepregs were sufficiently durable during the use.

By using this self-adhesive prepreg, the honeycomb laminated composite material was produced in a manner similar to Example 1. The average peeling strength of the obtained self-adhesive prepreg is shown in Table 1. The average peeling strength of the prepregs according to Examples 2 and 3 was as extremely high as more than 30 N/cm.

Example 4

A base prepreg according to Example 4 was produced in a manner similar to Example 1 except that the base prepreg contained resin by 37% by mass. Next, in a manner similar to Example 1, the resin sheet containing the resin with a mass per unit area of 160 g/m² was obtained. On the surface of this resin sheet, the nonwoven fabric 1 was placed and thus, the adhesive layer sheet was produced. After that, on the surface of this base prepreg, the adhesive layer sheet was laminated with the surface thereof containing much resin facing inward, which is opposite to Example 1, and then pressure was applied thereto using the roller at 30° C.; thus, the prepreg was obtained.

Using this prepreg, the honeycomb laminated composite material was produced in a manner similar to Example 1. The average peeling strength of the honeycomb laminated composite material including the prepreg according to Example 4, in which the order of laminating the nonwoven fabric and the resin sheet was different from that of the present invention, was 20 N/cm, which is lower than that of Example 1.

Examples 5 and 6

Self-adhesive prepregs according to Examples 5 and 6 were produced and obtained in a manner similar to Example 1 except that the nonwoven fabric 1 was replaced by the nonwoven fabric 2 and the mass per unit area of the resin sheet was changed as shown in Table 1. Evaluating the draping property of the obtained self-adhesive prepregs indicates that both self-adhesive prepregs according to Examples 5 and 6 resisted a little when laid up to the die and it took some time and effort in the laying up work. However, after the lay-up, the crease or the buckling did not occur in the prepregs and the prepregs were sufficiently durable during the use.

By using this self-adhesive prepreg, the honeycomb laminated composite material was produced in a manner similar to Example 1. The average peeling strength of the obtained honeycomb laminated composite material is shown in Table 1. The average peeling strength of the honeycomb laminated composite material including the prepregs according to Examples 5 and 6 was sufficiently high.

Examples 7 and 8

Self-adhesive prepregs according to Examples 7 and 8 were produced and obtained in a manner similar to Example 3 except that the nonwoven fabric 1 punched with a needle and having the 10%-extension load as shown in Table 1 was used as the nonwoven fabric. The draping property of the obtained self-adhesive prepregs was evaluated. The self-adhesive prepregs according to Examples 7 and 8 did not resist when laid up to the die, and were laid up to the die smoothly. After the lay-up, the crease or the buckling did not occur in the prepregs and the prepregs with the excellent draping property were obtained.

By using the self-adhesive prepreg, the honeycomb laminated composite material was produced in a manner similar to Example 1. The average peeling strength of the obtained honeycomb laminated composite material is shown in Table 1. The average peeling strength of the honeycomb laminated composite material including the prepregs according to Examples 7 and 8 was extremely high.

TABLE 1

|  |  |  | Comparative example | | | Example | | | | | | | |
|---|---|---|---|---|---|---|---|---|---|---|---|---|---|
|  |  |  | 1 | 2 | 3 | 1 | 2 | 3 | 4 | 5 | 6 | 7 | 8 |
| Base prepreg | Resin content | % | 44 | 44 | 37 | 35 | 35 | 35 | 37 | 35 | 35 | 35 | 35 |
| Resin film | Resin mass per unit area | gsm | — | 200 | — | 145 | 175 | 200 | 160 | 150 | 200 | 200 | 200 |
| Nonwoven fabric | Kind | — | None | None | Nonwoven fabric 1 | Nonwoven fabric 1 | Nonwoven fabric 1 | Nonwoven fabric 1 | Nonwoven fabric 1 | Nonwoven fabric 2 | Nonwoven fabric 2 | Nonwoven fabric 1 | Nonwoven fabric 1 |
|  | Mass per unit area | gsm | — | — | 30 | 30 | 30 | 30 | 30 | 30 | 30 | 30 | 30 |
|  | Needle punching process | — | — | — | Yes | No | No | No | No | No | No | Yes | Yes |
|  | 10%-extension load | N | — | — | 25.7 | 30.1 | 30.1 | 30.1 | 30.1 | 34.2 | 34.2 | 25.7 | 11.5 |
| Average peeling strength |  | N/cm | 9 | 14 | 6 | 23 | 34 | 36 | 20 | 25 | 34 | 36 | 37 |

Example 9

A self-adhesive prepreg according to Example 9 was produced and obtained in a manner similar to Example 1 except that the base prepreg contained resin by 37% by mass, the resin sheet contained the resin with a mass per unit area of 160 g/m$^2$, and the nonwoven fabric 1 that was punched with a needle and had the 10%-extension load as shown in Table 2 was used as the nonwoven fabric. The draping property of the obtained self-adhesive prepreg was evaluated. The obtained self-adhesive prepreg did not resist when laid up to the die, and was laid up to the die smoothly. After the lay-up, the crease or the buckling did not occur in the prepreg and the prepreg with the excellent draping property was obtained.

By using the self-adhesive prepreg, the honeycomb laminated composite material was produced in a manner similar to Example 1. The average peeling strength of the obtained honeycomb laminated composite material is shown in Table 2. The average peeling strength of the honeycomb laminated composite material including the prepreg according to Example 9 was as extremely high as 33 N/cm.

Example 10

A self-adhesive prepreg according to Example 10 was produced and obtained in a manner similar to Example 3 except that the base prepreg contained resin by 37% by mass. The draping property of the obtained self-adhesive prepreg was evaluated. Evaluating the draping property of the obtained self-adhesive prepreg indicates that the self-adhesive prepreg according to Example 10 resisted a little when laid up to the die and it took some time and effort in the laying up work. However, after the lay-up, the crease or the buckling did not occur in the prepreg and the prepreg was sufficiently durable during the use.

By using the self-adhesive prepreg, the honeycomb laminated composite material was produced in a manner similar to Example 1. The average peeling strength of the obtained honeycomb laminated composite material is shown in Table 2. The average peeling strength of the honeycomb laminated composite material including the prepreg according to Example 10 was as extremely high as 37 N/cm.

Example 11

A self-adhesive prepreg according to Example 11 was produced and obtained in a manner similar to Example 1 except that the base prepreg contained resin by 37% by mass, the resin sheet contained the resin with a mass per unit area of 190 g/m$^2$, and the nonwoven fabric 1 that was punched with a needle and had the 10%-extension load as shown in Table 2 was used as the nonwoven fabric. The draping property of the obtained self-adhesive prepreg was evaluated. The obtained self-adhesive prepreg did not resist when laid up to the die, and was laid up to the die smoothly. After the lay-up, the crease or the buckling did not occur in the prepreg and the prepreg with the excellent draping property was obtained.

By using the self-adhesive prepreg, the honeycomb laminated composite material was produced in a manner similar to Example 1. The average peeling strength of the obtained honeycomb laminated composite material is shown in Table 2. The average peeling strength of the honeycomb laminated composite material including the prepreg according to Example 11 was as extremely high as 38 N/cm.

Example 12

A self-adhesive prepreg according to Example 12 was produced and obtained in a manner similar to Example 1 except that the base prepreg contained resin by 39% by mass and the resin sheet contained the resin with a mass per unit area of 160 g/m$^2$. The draping property of the obtained self-adhesive prepreg was evaluated. The obtained prepreg resisted a little when laid up to the die, and it took some time and effort in the laying up work. However, after the lay-up, the crease or the buckling did not occur in the prepreg and the prepreg was sufficiently durable during the use.

By using the self-adhesive prepreg, the honeycomb laminated composite material was produced in a manner similar to Example 1. The average peeling strength of the obtained honeycomb laminated composite material is shown in Table 2. The average peeling strength of the honeycomb laminated composite material including the prepreg according to Example 12 was as extremely high as 41 N/cm.

Example 13

A self-adhesive prepreg according to Example 13 was produced and obtained in a manner similar to Example 1 except that the base prepreg contained resin by 39% by mass, the resin sheet contained the resin with a mass per unit area of 190 g/m$^2$, and the nonwoven fabric 1 that was punched with a needle and had the 10%-extension load as shown in Table 2 was used as the nonwoven fabric. The obtained self-adhesive prepreg did not resist when laid up to the die, and was laid up to the die smoothly. After the lay-up, the crease or the buckling did not occur in the prepreg and the prepreg with the excellent draping property was obtained.

By using the self-adhesive prepreg, the honeycomb laminated composite material was produced in a manner similar to Example 1. The average peeling strength of the honeycomb laminated composite material including the prepreg according to Example 13 was as extremely high as 41 N/cm.

Example 14

A self-adhesive prepreg according to Example 14 was produced and obtained in a manner similar to Example 1 except that the base prepreg contained resin by 44% by mass and the resin sheet contained the resin with a mass per unit area of 100 g/m$^2$. Evaluating the draping property of the obtained self-adhesive prepreg indicates that the obtained self-adhesive prepreg resisted a little when laid up to the die and it took some time and effort in the laying up work. However, after the lay-up, the crease or the buckling did not occur in the prepreg and the prepreg was sufficiently durable during the use.

By using the self-adhesive prepreg, the honeycomb laminated composite material was produced in a manner similar to Example 1. The average peeling strength of the honeycomb laminated composite material including the prepreg according to Example 14 was as sufficiently high as 21 N/cm.

Example 15

A self-adhesive prepreg according to Example 15 was produced and obtained in a manner similar to Example 1 except that the base prepreg contained resin by 44% by mass and the resin sheet contained the resin with a mass per unit area of 200 g/m$^2$. Evaluating the draping property of the obtained self-adhesive prepreg indicates that the obtained self-adhesive prepreg resisted a little when laid up to the die and it took some time and effort in the laying up work. However, after the lay-up, the crease or the buckling did not occur in the prepreg and the prepreg was sufficiently durable during the use.

By using the self-adhesive prepreg, the honeycomb laminated composite material was produced in a manner similar to Example 1. The average peeling strength of the honeycomb laminated composite material including the prepreg according to Example 15 was as extremely high as 39 N/cm.

Example 16

A self-adhesive prepreg according to Example 16 was produced and obtained in a manner similar to Example 1 except that the base prepreg contained resin by 39% by mass, the resin sheet contained the resin with a mass per unit area of 180 g/m$^2$, and the nonwoven fabric 3 that was punched with a needle and had the 10%-extension load as shown in Table 2 was used as the nonwoven fabric. The obtained self-adhesive prepreg did not resist when laid up to the die, and was laid up to the die smoothly. After the lay-up, the crease or the buckling did not occur in the prepreg and the prepreg with the excellent draping property was obtained.

By using the self-adhesive prepreg, the honeycomb laminated composite material was produced in a manner similar to Example 1. The average peeling strength of the honeycomb laminated composite material including the prepreg according to Example 16 was as extremely high as 39 N/cm.

Example 17

A self-adhesive prepreg according to Example 17 was produced and obtained in a manner similar to Example 1 except that the base prepreg contained resin by 39% by mass, the resin sheet contained the resin with a mass per unit area of 180 g/m$^2$, and the nonwoven fabric 3 that was punched with a needle and had the 10%-extension load as shown in Table 2 was used as the nonwoven fabric. Evaluating the draping property of the obtained self-adhesive prepreg indicates that, after the lay-up, the crease or the buckling occurred in the prepreg and although the prepreg was usable, the draping property was insufficient.

By using the self-adhesive prepreg, the honeycomb laminated composite material was produced in a manner similar to Example 1. The average peeling strength of the honeycomb laminated composite material including the prepreg according to Example 17 was as extremely high as 38 N/cm.

Example 18

A self-adhesive prepreg according to Example 18 was produced and obtained in a manner similar to Example 1 except that the base prepreg contained resin by 39% by mass and the resin sheet contained the resin with a mass per unit area of 350 g/m$^2$. Evaluating the draping property of the obtained self-adhesive prepreg indicates that the obtained self-adhesive prepreg resisted a little when laid up to the die and it took some time and effort in the laying up work. However, after the lay-up, the crease or the buckling did not occur in the prepreg and the prepreg was sufficiently durable during the use.

By using the self-adhesive prepreg, the honeycomb laminated composite material was produced in a manner similar to Example 1. The average peeling strength of the honeycomb laminated composite material including the prepreg according to Example 18 was as extremely high as 41 N/cm.

Example 19

In the kneader, jER604 and jER828 were heated and mixed at 120° C. PES was added to the obtained mixture, and in the kneader, heating and mixing were performed at 120° C., so that PES was dissolved completely. Subsequently, the obtained resin mixture was transferred to the roll mill and DICY, DDS, DCMU, and ZEFIAC were added thereto by the amount shown below and kneaded well at 80° C.; thus, the epoxy resin composition according to the present example was obtained. The minimum resin viscosity of this resin composition was 20 Poise, and the viscosity at 120° C. was 70 Poise.

Content of Epoxy Resin Composition
jER604: 40 parts by mass
jER828: 60 parts by mass
PES: 20 parts by mass
DYCY: 2 parts by mass
DDS: 20 parts by mass
DCMU: 0.5 parts by mass
ZEFIAC: 4 parts by mass By using this thermosetting resin composition, the self-adhesive prepreg was produced and obtained in a manner similar to Example 1 except that the base prepreg contained resin by 37% by mass, the resin sheet contained the resin with a mass per unit area of 170 g/m$^2$, and the nonwoven fabric 1 that was punched with a needle and had the 10%-extension load as shown in Table 2 was used as the nonwoven fabric. The draping property of the obtained self-adhesive prepreg was evaluated. The obtained self-adhesive prepreg did not resist when laid up to the die, and was laid up to the die smoothly. After the lay-up, the crease or the buckling did not occur in the prepreg and the prepreg with the excellent draping property was obtained.

By using the self-adhesive prepreg, the honeycomb laminated composite material was produced in a manner similar to Example 1. The resin flow in the molding was smaller than that in Example 1, and the mold releasing property was also excellent. The average peeling strength of the obtained honeycomb laminated composite material is shown in Table 2. The average peeling strength of the honeycomb laminated composite material including the prepreg according to Example 19 was as extremely high as 36 N/cm.

TABLE 2

| | | | Example | | | | | | | | | |
|---|---|---|---|---|---|---|---|---|---|---|---|---|
| | | | 9 | 10 | 11 | 12 | 13 | 14 | 15 | 16 | 17 | 18 | 19 |
| Base prepreg | Resin content | % | 37 | 37 | 37 | 39 | 39 | 44 | 44 | 39 | 39 | 39 | 37 |
| Resin film | Resin mass per unit area | gsm | 160 | 200 | 190 | 160 | 190 | 100 | 200 | 180 | 180 | 350 | 170 |

TABLE 2-continued

| | | | Example | | | | | | | | | | |
|---|---|---|---|---|---|---|---|---|---|---|---|---|---|
| | | | 9 | 10 | 11 | 12 | 13 | 14 | 15 | 16 | 17 | 18 | 19 |
| Non-woven fabric | Kind | — | Non-woven fabric 1 | Non-woven fabric 1 | Non-woven fabric 1 | Non-woven fabric 1 | Non-woven fabric 1 | Non-woven fabric 1 | Non-woven fabric 1 | Non-woven fabric 1 | Non-woven fabric 1 | Non-woven fabric 1 | Non-woven fabric 1 |
| | Mass per unit area | gsm | 30 | 30 | 30 | 30 | 30 | 30 | 30 | 40 | 40 | 30 | 30 |
| | Needle punching process | — | Yes | No | Yes | No | Yes | No | No | Yes | Yes | No | Yes |
| | 10%-extension load | N | 25.7 | 30.1 | 7.0 | 30.1 | 17.8 | 30.1 | 30.1 | 24.7 | 37.0 | 30.1 | 20.1 |
| Average peeling strength | | N/cm | 33 | 37 | 38 | 41 | 41 | 21 | 39 | 39 | 38 | 41 | 36 |

The invention claimed is:

1. A self-adhesive prepreg comprising:
a base prepreg including reinforcing fibers, and a thermosetting resin composition (I) that is partially or entirely impregnated into a reinforcing fiber layer that is formed of the reinforcing fibers; and
an adhesive layer including a nonwoven fabric that is laminated on at least one surface of the base prepreg so as to be integrated with the base prepreg, and a thermosetting resin composition (II) layer that is laminated on a surface of the nonwoven fabric so as to be integrated with the nonwoven fabric
wherein
the base prepreg contains the thermosetting resin composition (I) by 30 to 50% by mass,
the thickness of the base prepreg is 60 to 500 µm,
the content of the thermosetting resin composition (II) is 100 to 300 g/m$^2$,
the thermosetting resin composition (I) and the thermosetting resin composition (II) are compatible and are mixed at the time of pressure molding,
the thermosetting resin composition (I) and the thermosetting resin composition (II) has a minimum resin viscosity of 0.1 to 100 Poise,
the nonwoven fabric is formed of thermoplastic resin,
the thickness of the nonwoven fabric is 0.15 to 1.0 mm,
the mass per unit area of the nonwoven fabric is 10 to 50 g/m$^2$, and
the nonwoven fabric has a 10% extension load of 35 N or less.

2. The self-adhesive prepreg according to claim 1, wherein each of the thermosetting resin composition (I) and the thermosetting resin composition (II) is an epoxy resin composition.

3. The self-adhesive prepreg according to claim 1, wherein the thermosetting resin composition (I) and the thermosetting resin composition (II) have the same composition.

4. The self-adhesive prepreg according to claim 1, wherein in the adhesive layer, the thermosetting resin composition (II) concentrates on a side of a surface of the adhesive layer opposite to a surface thereof that is in contact with the base prepreg.

5. A method for producing the self-adhesive prepreg according to claim 1, the method comprising:
obtaining the base prepreg by impregnating the thermosetting resin composition (I) into the reinforcing fiber layer; and
laminating the adhesive layer including the nonwoven fabric and the thermosetting resin composition (II) on the surface of the prepreg so as to be integrated with the base prepreg.

6. A method for producing a honeycomb laminated composite material, the method comprising molding a honeycomb core laminate, in which the self-adhesive prepreg according to claim 1 and a honeycomb core are laminated, by applying heat and pressure.

7. A honeycomb laminated composite material comprising a honeycomb core, and a cured body of the self-adhesive prepreg according to claim 1 that is laminated on a surface of the honeycomb core so as to be attached to the honeycomb core.

* * * * *